(12) United States Patent
Takeuchi et al.

(10) Patent No.: US 11,760,261 B2
(45) Date of Patent: Sep. 19, 2023

(54) DROP-OFF ASSIST DEVICE

(71) Applicants: TOYOTA JIDOSHA KABUSHIKI KAISHA, Toyota (JP); Continental Automotive GmbH, Hannover (DE)

(72) Inventors: Koji Takeuchi, Toyota (JP); Masanori Tokuda, Miyoshi (JP); Masaho Ishida, Toyota (JP); Junya Fukuta, Nagoya (JP); Kenichi Miyasako, Yokohama (JP)

(73) Assignees: TOYOTA JIDOSHA KABUSHIKI KAISHA, Toyota (JP); Continental Automotive GmbH, Hanover (DE)

( * ) Notice: Subject to any disclaimer, the term of this patent is extended or adjusted under 35 U.S.C. 154(b) by 15 days.

(21) Appl. No.: 17/702,174

(22) Filed: Mar. 23, 2022

(65) Prior Publication Data

US 2022/0305991 A1    Sep. 29, 2022

(30) Foreign Application Priority Data

Mar. 25, 2021 (JP) ................................. 2021-052168

(51) Int. Cl.
*B60Q 9/00* (2006.01)
*G01S 13/62* (2006.01)
*G01S 13/931* (2020.01)
*G08B 21/18* (2006.01)

(52) U.S. Cl.
CPC .............. *B60Q 9/008* (2013.01); *G01S 13/62* (2013.01); *G01S 13/931* (2013.01); *G08B 21/182* (2013.01)

(58) Field of Classification Search
CPC ........... B60Q 9/008; B60Q 9/00; G01S 13/62; G01S 13/931; G01S 2013/9314; G08B 21/182; B60K 28/12; B60W 30/0956; B60W 50/0098; B60W 50/14; G08G 1/168; G08G 1/167; E05B 77/22; E05B 81/64

See application file for complete search history.

(56) References Cited

U.S. PATENT DOCUMENTS

2017/0218678 A1* 8/2017 Kothari ................... E05F 15/40
2020/0108770 A1   4/2020 Fukuta

FOREIGN PATENT DOCUMENTS

| JP | 2007-138457 A | 6/2007 |
| JP | 2012-116348 A | 6/2012 |
| JP | 2018-008576 A | 1/2018 |

* cited by examiner

*Primary Examiner* — Daryl C Pope
(74) *Attorney, Agent, or Firm* — Sughrue Mion, PLLC

(57) ABSTRACT

A drop-off assist device includes: a processor configured to determine that there is a possibility that a target approaching object passes by a door of a host vehicle when a second object is not present between the target approaching object and the host vehicle, correct the predicted movement path based on a position of an edge of the second object when the second object is present between the target approaching object and the host vehicle at a timing of setting the target approaching object, determine that there is the possibility that the target approaching object passes by the door of the host vehicle when the corrected predicted movement path is the path that passes by the door of the host vehicle, and issue an alarm when determining that there is the possibility that the target approaching object passes by the door of the host vehicle.

3 Claims, 13 Drawing Sheets

FIG. 3A
FIG. 3B
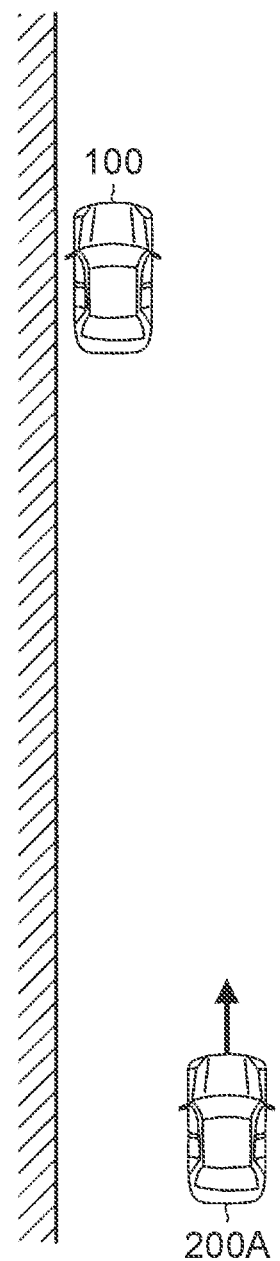
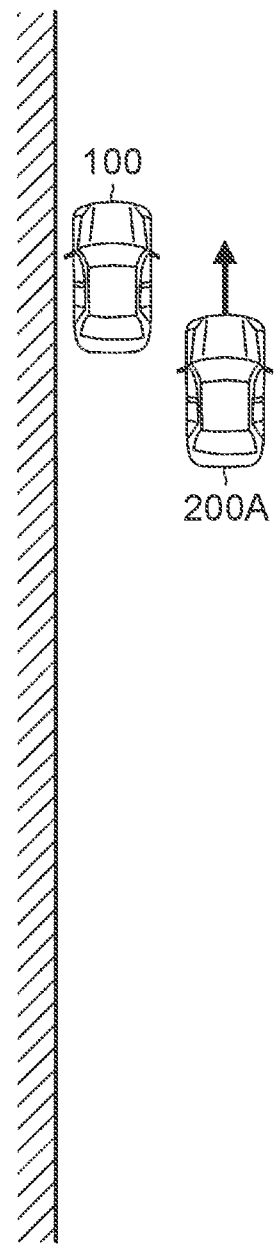

DROP-OFF ASSIST DEVICE

CROSS-REFERENCE TO RELATED APPLICATION

This application claims priority to Japanese Patent Application No. 2021-052168 filed on Mar. 25, 2021, incorporated herein by reference in its entirety.

BACKGROUND

1. Technical Field

The present disclosure relates to a drop-off assist device.

2. Description of Related Art

There is known, as a related art, a drop-off assist device that does not allow an occupant from getting off the host vehicle by not allowing the occupant to open a door upon detecting an object that may pass by the host vehicle while the host vehicle is stationary (see Japanese Unexamined Patent Application Publication No. 2007-138457 (JP 2007-138457 A), for example). There is also known, as another related art, a drop-off assist device that informs an occupant of the host vehicle of the presence of an object that may pass by the host vehicle by issuing an alarm upon detecting an object that may pass by the host vehicle while the host vehicle is stationary. Such drop-off assist devices can improve the safety of occupants of the host vehicle.

SUMMARY

A drop-off assist device that makes use of a radio wave sensor such as a radar sensor to detect an object (approaching object) such as a vehicle that is approaching the host vehicle while the host vehicle is stationary is known as a drop-off assist device according to the related art. The radio wave sensor outputs radio waves, which are diffracted by an edge of an object. Thus, when there is an object that is different from the approaching object between the approaching object and the host vehicle, the radio waves (reflected waves) output from the radio wave sensor and reflected by the approaching object are occasionally diffracted by an edge of the different object. An erroneous determination may be made as to whether the approaching object possibly passes by a door of the host vehicle if a movement path of the approaching object is predicted based on the diffracted radio waves (reflected waves).

The present disclosure provides a drop-off assist device that can accurately determine whether an approaching object possibly passes by a door of the host vehicle even when a different object is present between the approaching object and the host vehicle.

A drop-off assist device according to an aspect of the present disclosure includes: a radio wave sensor configured to detect an object; and a processor configured to detect an object that is approaching a host vehicle based on results of detection by the radio wave sensor, acquire a predicted movement path of the object based on the results of the detection by the radio wave sensor when the object is detected, set the object as a target approaching object when the predicted movement path acquired by the processor is a path that passes by a door of the host vehicle, determine that there is a possibility that the target approaching object passes by the door of the host vehicle when a second object that is different from the target approaching object is not present between the target approaching object and the host vehicle, correct the predicted movement path based on a position of an edge of the second object when the second object is present between the target approaching object and the host vehicle at a timing of setting the target approaching object, determine that there is the possibility that the target approaching object passes by the door of the host vehicle when the predicted movement path corrected by the processor is the path that passes by the door of the host vehicle, and issue an alarm when determining that there is the possibility that the target approaching object passes by the door of the host vehicle.

If a different object is present between the target approaching object and the host vehicle, there is a possibility that radio waves reflected by the target approaching object are diffracted by an edge of the different object. If determination is made based on the predicted movement path acquired based on the radio waves in such a case whether the target approaching object possibly passes by the door of the host vehicle, an erroneous determination may be made. According to the above aspect, the predicted movement path of the target approaching object is corrected based on the position of an edge of a different object when a different object is present between the target approaching object and the host vehicle, and determination is made based on the corrected predicted movement path whether the target approaching object possibly passes by the door of the host vehicle. Therefore, it is possible to precisely determine whether the target approaching object possibly passes by the door of the host vehicle even when a different object is present between the target approaching object and the host vehicle.

In the above aspect, the processor may be configured to: determine that the predicted movement path acquired by the processor is the path that passes by the door of the host vehicle when the predicted movement path acquired by the processor is a path that passes through an area within a predetermined distance in a vehicle transverse direction from the host vehicle; and determine that the predicted movement path corrected by the processor is the path that passes by the door of the host vehicle when the predicted movement path corrected by the processor is the path that passes through the area within the predetermined distance in the vehicle transverse direction.

The target approaching object is an element that affects whether to issue an alarm. Thus, in order to appropriately determine whether to issue an alarm, the object determined as the target approaching object may be an object, the predicted movement path of which is a path that passes through an area within a certain distance in the transverse direction from the host vehicle. According to the above configuration, an object that is approaching the host vehicle and the predicted movement path of which passes through an area within a predetermined distance in the transverse direction from the host vehicle is detected as the approaching object. Therefore, it is possible to determine whether to issue an alarm more appropriately.

In the above aspect, the processor may be configured to set the object as the target approaching object when the predicted movement path acquired by the processor is the path that passes by the door of the host vehicle at a time when a time predicted to be taken before the object reaches a location by the door of the host vehicle becomes equal to or less than a predetermined time.

According to the above configuration, the movement path condition is met when the time predicted to be taken before the target approaching object passes by the door of the host vehicle has become equal to or less than the predetermined time. An alarm is issued when the target approaching object has come close to the host vehicle rather than when the target approaching object is moving at a location far from the host vehicle. That is, an alarm can be issued appropriately.

The constituent elements according to the present disclosure are not limited to those according to an embodiment of the present disclosure to be discussed later with reference to the drawings. Other objects, other features, and accompanying advantages of the present disclosure will be easily understood from the description of the embodiment of the present disclosure.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3A illustrates a scene in which a vehicle (approaching vehicle) is approaching the host vehicle from behind;

FIG. 3B illustrates a scene in which the approaching vehicle is passing by the host vehicle;

DETAILED DESCRIPTION OF EMBODIMENTS

Figure 1:
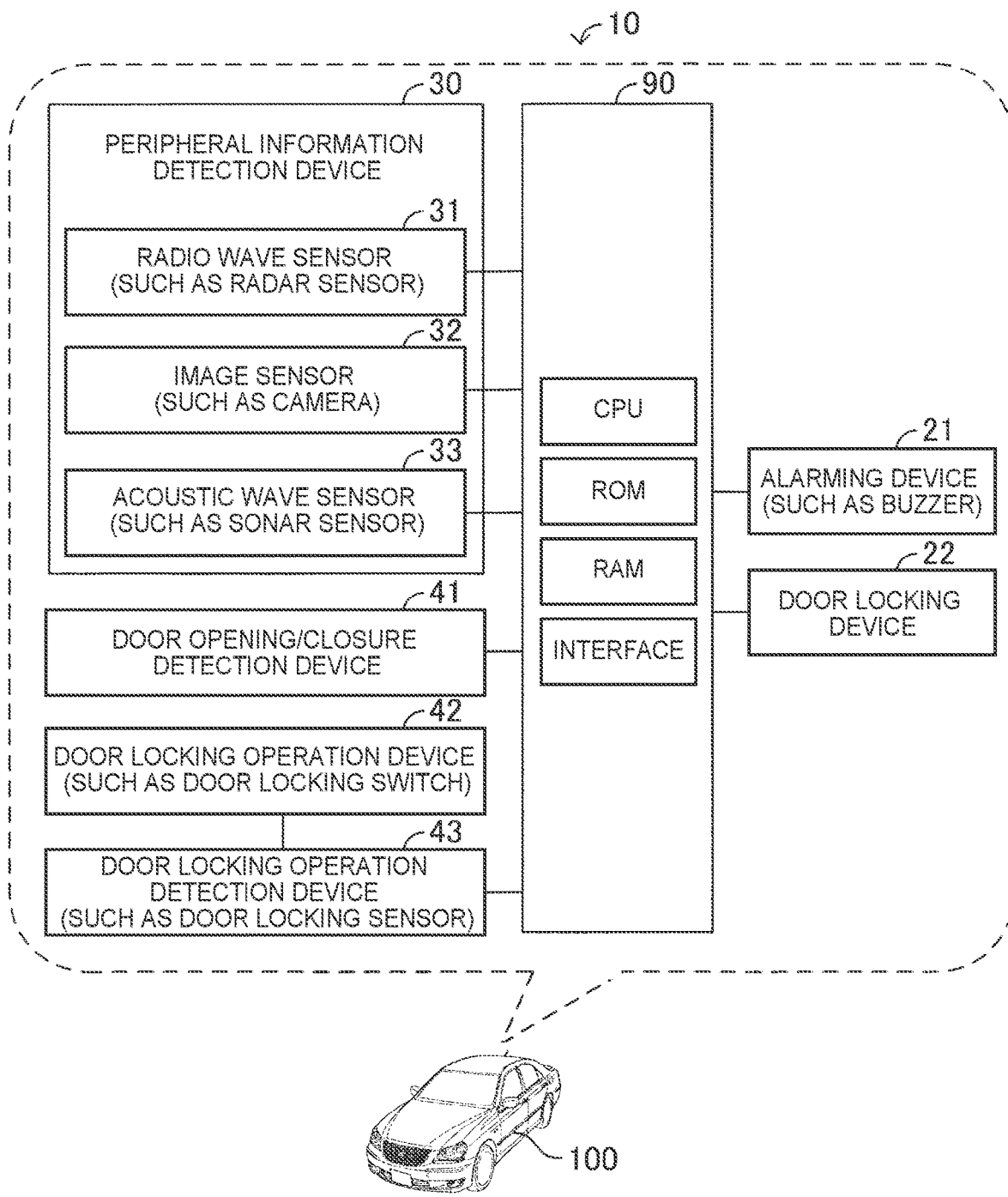
FIG. 1 illustrates a drop-off assist device according to an embodiment of the present disclosure and a vehicle (host vehicle) on which the drop-off assist device is mounted.

A drop-off assist device according to an embodiment of the present disclosure will be described below with reference to the drawings. FIG. 1 illustrates a drop-off assist device 10 according to an embodiment of the present disclosure. The drop-off assist device 10 is mounted on a vehicle (host vehicle 100).

Figure 2:
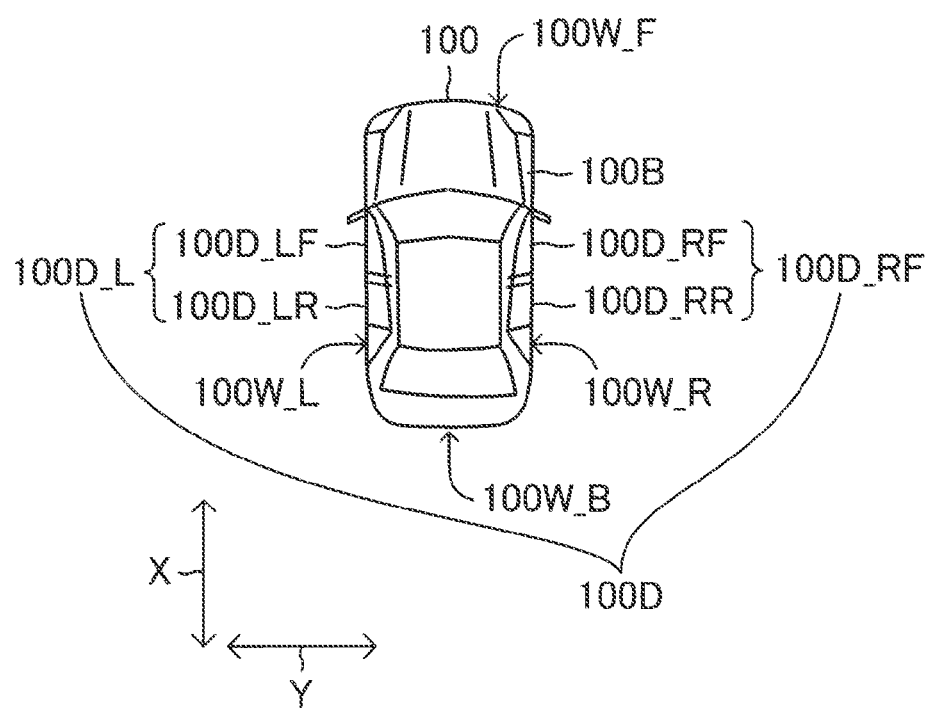
FIG. 2 illustrates the host vehicle.

In the present embodiment, as illustrated in FIG. 2, the host vehicle 100 includes four doors 100D. The four doors 100D include a right front door 100D_RF provided at the right front of the host vehicle 100, a right rear door 100D_RR provided at the right rear of the host vehicle 100, a left front door 100D_LF provided at the left front of the host vehicle 100, and a left rear door 100D_LR provided at the left rear of the host vehicle 100.

In the drawings, reference sign X denotes the longitudinal direction of the host vehicle 100, and reference sign Y denotes the transverse direction (vehicle transverse direction) of the host vehicle 100. Thus, the longitudinal direction X corresponds to the front-rear direction or the overall length direction of the host vehicle 100, and the transverse direction Y corresponds to the right-left direction or the width direction of the host vehicle 100.

In the present embodiment, the doors 100D are each a swing (pivot) door. Thus, the doors 100D are attached to a vehicle body 100B of the host vehicle 100 so as to be swingable (pivotable) about a pivot axis that extends vertically at the front portion of the doors 100D. One or more of the doors 100D may be a slide (sliding) door.

In the following description, the right front door 100D_RF and the right rear door 100D_RR are each referred to as a "right-side door 100D_R", and the left front door 100D_LF and the left rear door 100D_LR are each referred to as a "left-side door 100D_L".

ECU

The drop-off assist device 10 includes an ECU 90. The term "ECU" is an abbreviation of an electronic control unit. The ECU 90 includes a microcomputer as a main component. The microcomputer includes a central processing unit (CPU), a read only memory (ROM), a random access memory (RAM), a non-volatile memory, an interface, etc. The CPU executes an instruction, a program, or a routine stored in the ROM to implement various functions.

Alarming Device Etc.

An alarming device 21 and a door locking device 22 are mounted on the host vehicle 100.

Alarming Device

The alarming device 21 is a buzzer that outputs various alarming sounds, for example. The alarming device 21 is electrically connected to the ECU 90. The ECU 90 can cause the alarming device 21 to output an alarming sound.

Door Locking Device

The door locking device 22 is a device that locks and unlocks the doors 100D. The door locking device 22 is electrically connected to the ECU 90. The ECU 90 can control operation of the door locking device 22.

Peripheral Information Detection Device Etc.

Further, a peripheral information detection device 30, a door opening/closure detection device 41, a door locking operation device 42, and a door locking operation detection device 43 are mounted on the host vehicle 100.

Peripheral Information Detection Device

The peripheral information detection device 30 is a device that detects information around the host vehicle 100, and includes a radio wave sensor 31 and an image sensor 32 in the present embodiment. The radio wave sensor 31 is a radar sensor (such as a millimeter-wave radar), for example. The image sensor 32 is a camera, for example. The peripheral information detection device 30 may include an acoustic wave sensor such as an ultrasonic sensor (clearance sonar) or a light sensor such as a laser radar (LiDAR).

The radio wave sensor 31 is electrically connected to the ECU 90. The radio wave sensor 31 emits radio waves, and receives radio waves (reflected waves) reflected by an object. The radio wave sensor 31 transmits information (detection results) about the emitted radio waves and the received radio waves (reflected waves) to the ECU 90. In other words, the radio wave sensor 31 detects an object that is present around the host vehicle 100, and transmits information (detection results) about the detected object to the ECU 90. The ECU 90 can acquire information (object information I_O) about the object that is present around the host vehicle 100 based on the information (radio-wave information I_R). In the present embodiment, the object detected by the radio wave sensor 31 may be a vehicle, a motorcycle, a bicycle, a pedestrian, etc.

The image sensor 32 is also electrically connected to the ECU 90. The image sensor 32 captures an image around the host vehicle 100, and transmits information about the captured image to the ECU 90. The ECU 90 can acquire information (peripheral information I-S) about an area around the host vehicle 100 based on the information (image information I_C).

Door Opening/Closure Detection Device

The door opening/closure detection device 41 is a device that detects whether the doors 100D are open or closed. The door opening/closure detection device 41 is electrically connected to the ECU 90. The door opening/closure detection device 41 detects whether the doors 100D are open or closed, and transmits information about the detection results to the ECU 90. The ECU 90 can recognize whether the doors 100D are open or closed based on such information.

Door Locking Operation Device

The door locking operation device 42 is a device that locks and unlocks the doors 100D, and may be a door locking switch to be operated by an occupant of the host vehicle 100 or a door locking sensor that detects an operation performed on the door locking operation device 42, for example.

The door locking operation device 42 is electrically connected to the door locking operation detection device 43. The door locking operation detection device 43 is electrically connected to the ECU 90. The door locking operation detection device 43 detects an operation performed on the door locking operation device 42, and transmits information about the detected operation to the ECU 90. The ECU 90 locks and unlocks the doors 100D by actuating the door locking device 22 in accordance with the information. Thus, an occupant of the host vehicle 100 can lock and unlock the doors 100D using the door locking device 22 by operating the door locking operation device 42.

Overview of Operation of Drop-Off Assist Device

Next, an overview of operation of the drop-off assist device 10 will be described.

While operation of the drop-off assist device 10 at the time when the object that is approaching the host vehicle 100 is a vehicle that is approaching the host vehicle 100 from behind will be described below, the drop-off assist device 10 operates similarly also when the object that is approaching the host vehicle 100 is a vehicle that is approaching the host vehicle 100 from ahead. In addition, while operation of the drop-off assist device 10 at the time when the object that is approaching the host vehicle 100 is a vehicle will be described below, the drop-off assist device 10 operates similarly also when the object that is approaching the host vehicle 100 is another object such as a motorcycle, a bicycle, or a pedestrian.

Further, while operation of the drop-off assist device 10 at the time when the object that is present between the vehicle that is approaching the host vehicle 100 from behind and the host vehicle 100 is a vehicle will be described below, the drop-off assist device 10 operates similarly also when the object that is present between the vehicle that is approaching the host vehicle 100 from behind and the host vehicle 100 is another object such as a motorcycle, a bicycle, or a pedestrian.

As illustrated in FIG. 3A, there is occasionally a vehicle 200 that is approaching the host vehicle 100, which is stationary, from behind toward the door 100D of the host vehicle 100. The vehicle 200 (approaching vehicle 200A) occasionally passes by the host vehicle 100 as illustrated in FIG. 3B. If the door 100D of the host vehicle 100 is opened at this time, the approaching vehicle 200A may collide against the door 100D. Thus, by issuing an alarm (performing a process of outputting an alarming sound from the alarming device 21) when there is such a possibility, an occupant of the host vehicle 100, including a driver, can be informed that there is a possibility that the approaching vehicle 200A collides against the door 100D. If the occupant refrains from opening the door 100D in response to the alarm, it is possible to suppress the possibility of a collision between the approaching vehicle 200A and the door 100D if the occupant refrains from opening the door 100D.

Thus, in order to suppress the possibility of a collision between the approaching vehicle 200A and the door 100D of the host vehicle 100, a movement path of the approaching vehicle 200A is predicted and an alarm is issued when determination is made based on the predicted movement path that there is a possibility that the approaching vehicle 200A passes by the host vehicle 100.

The drop-off assist device 10 predicts a movement path of the approaching vehicle 200A based on the radio-wave information I_R acquired based on the information provided from the radio wave sensor 31, and determines based on the predicted movement path whether the approaching vehicle 200A possibly passes by the door 100D of the host vehicle 100.

Figure 4:
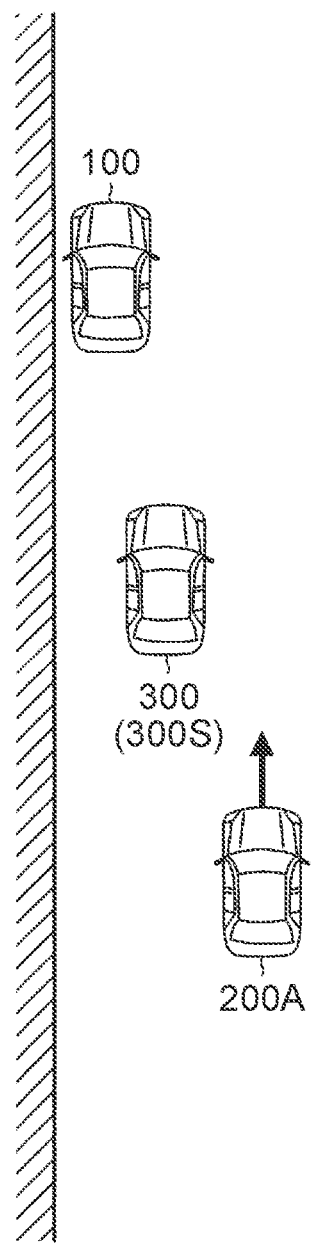
FIG. 4 illustrates a scene in which a different vehicle is present between a vehicle (approaching vehicle) that is approaching the host vehicle from behind and the host vehicle.
Figure 5:
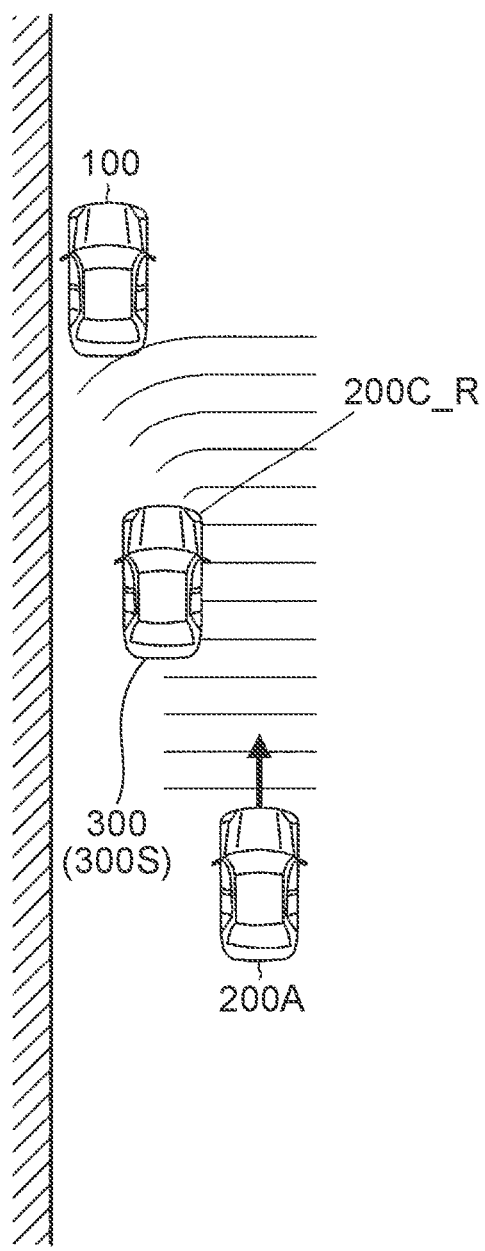
FIG. 5 illustrates radio waves (reflected waves) reflected by a vehicle (approaching vehicle) that is approaching the host vehicle from behind in a situation in which there is a different vehicle between the approaching vehicle and the host vehicle.
Figure 6:
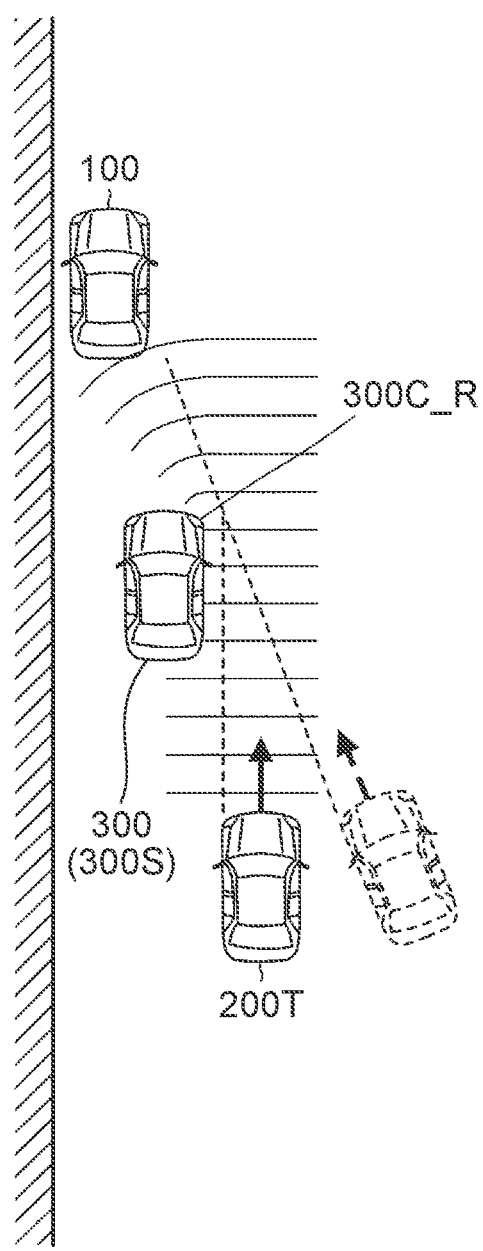
FIG. 6 illustrates a predicted movement path acquired based on radio waves (reflected waves) reflected by a vehicle (approaching vehicle) that is approaching the host vehicle from behind in a situation in which there is a different vehicle between the approaching vehicle and the host vehicle.

Meanwhile, as illustrated in FIG. 4, there is occasionally another vehicle 300, which is stationary, between the approaching vehicle 200A and the host vehicle 100. When such a stationary vehicle 300 (stationary vehicle 300S) is present, as illustrated in FIG. 5, radio waves (reflected waves) emitted from the radio wave sensor 31 and reflected by the approaching vehicle 200A are occasionally diffracted by an edge (a right front corner portion 300C_R of the stationary vehicle 300S in the example illustrated in FIG. 5) of the stationary vehicle 300S. When the radio waves are diffracted in this manner, as illustrated in FIG. 6, a predicted movement path of the approaching vehicle 200A acquired based on the radio waves may deviate from the true predicted movement path of the approaching vehicle 200A. If the true predicted movement path of the approaching vehicle 200A cannot be acquired, it is not possible to precisely predict whether the approaching vehicle 200A possibly passes by the door 100D of the host vehicle 100. As a result, an unnecessary alarm may be issued, or a necessary alarm may not be issued.

Thus, the drop-off assist device 10 determines based on the radio-wave information I_R whether the approaching vehicle 200A possibly passes by the door 100D of the host vehicle 100 as follows.

Figure 7A:
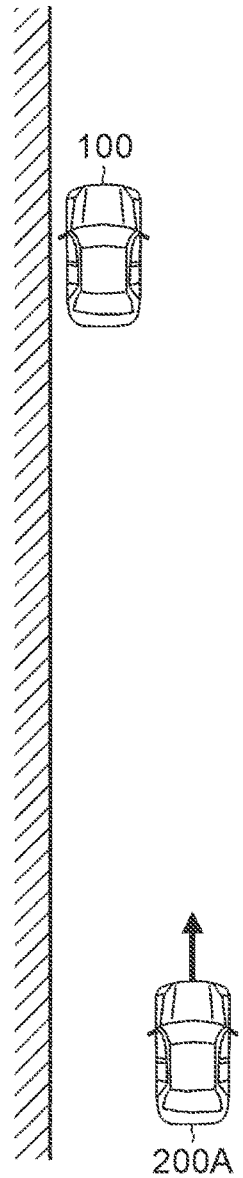
FIG. 7A illustrates a scene in which a vehicle (approaching vehicle) that is approaching the host vehicle from behind is detected.

The drop-off assist device 10 performs a process of detecting an approaching vehicle 200A based on the radio-wave information I_R. When a vehicle 200 is approaching the host vehicle 100 as illustrated in FIG. 7A, the drop-off assist device 10 detects the vehicle 200 as an approaching vehicle 200A based on the radio-wave information I_R.

When an approaching vehicle 200A is detected, the drop-off assist device 10 acquires a relative position P200 of the approaching vehicle 200A, a longitudinal distance D2_X to the approaching vehicle 200A, a relative speed dV of the approaching vehicle 200A, and a traveling direction D200 of the approaching vehicle 200A based on the radio-wave information I_R.

Figure 7B:
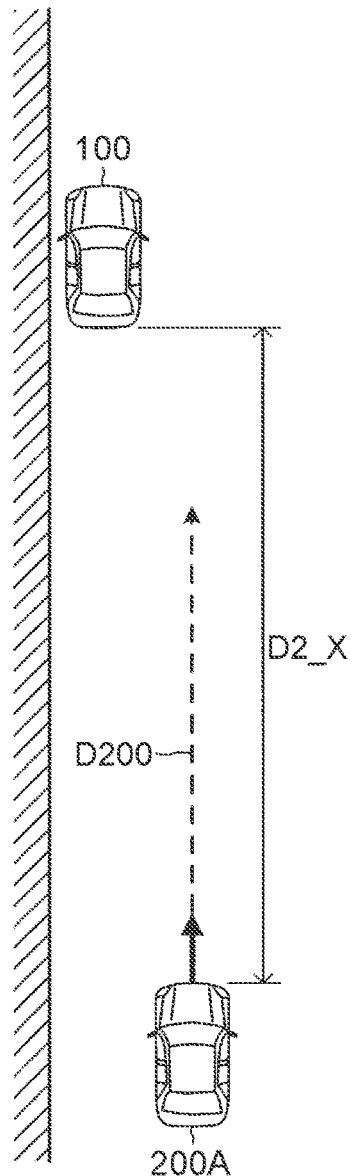
FIG. 7B illustrates the traveling direction of the approaching vehicle and the distance in the longitudinal direction between the approaching vehicle and the host vehicle.

The relative position P200 of the approaching vehicle 200A is the position of the approaching vehicle 200A relative to the host vehicle 100. The longitudinal distance D2_X to the approaching vehicle 200A is the distance from the host vehicle 100 to the approaching vehicle 200A in the longitudinal direction X as illustrated in FIG. 7B. The relative speed dV of the approaching vehicle 200A is the speed of the approaching vehicle 200A relative to the host vehicle 100. The traveling direction D200 of the approaching vehicle 200A is the traveling direction of the approaching vehicle 200A relative to the host vehicle 100 as illustrated in FIG. 7B.

The drop-off assist device 10 predicts a movement path of the approaching vehicle 200A based on the relative position P200, the traveling direction D200, etc. that have been acquired, and acquires the predicted movement path as a predicted movement path R200.

Figure 7C:
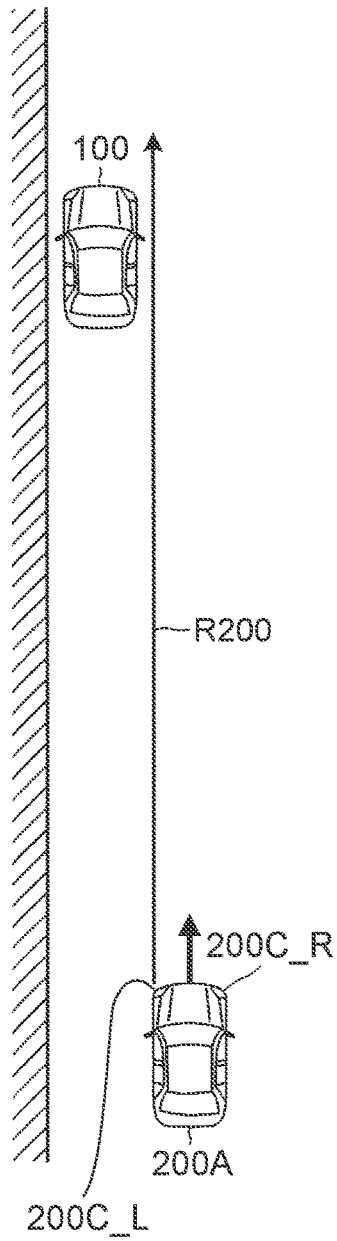
FIG. 7C illustrates a predicted movement path of a left front corner portion of the approaching vehicle.

In the present embodiment, as illustrated in FIG. 7C, the drop-off assist device 10 predicts a movement path of one (target portion P_T) of a right front corner portion 200C_R and a left front corner portion 200C_L of the approaching vehicle 200A that is closer to the host vehicle 100 in the transverse direction Y, and acquires the predicted movement path as a predicted movement path R200 of the approaching vehicle 200A. The drop-off assist device 10 acquires the predicted movement path R200 in predetermined computation cycles while the approaching vehicle 200A is detected.

The predicted movement path R200 is a path along which the target portion P_T is expected to move when it is assumed that the approaching vehicle 200A travels while keeping the traveling direction D200 at the time when such information is acquired. In the example illustrated in FIG. 7C, the approaching vehicle 200A is traveling on the right side of the host vehicle 100 in the transverse direction Y, and thus the target portion P_T corresponds to the left front corner portion 200C_L of the approaching vehicle 200A.

Figure 8:
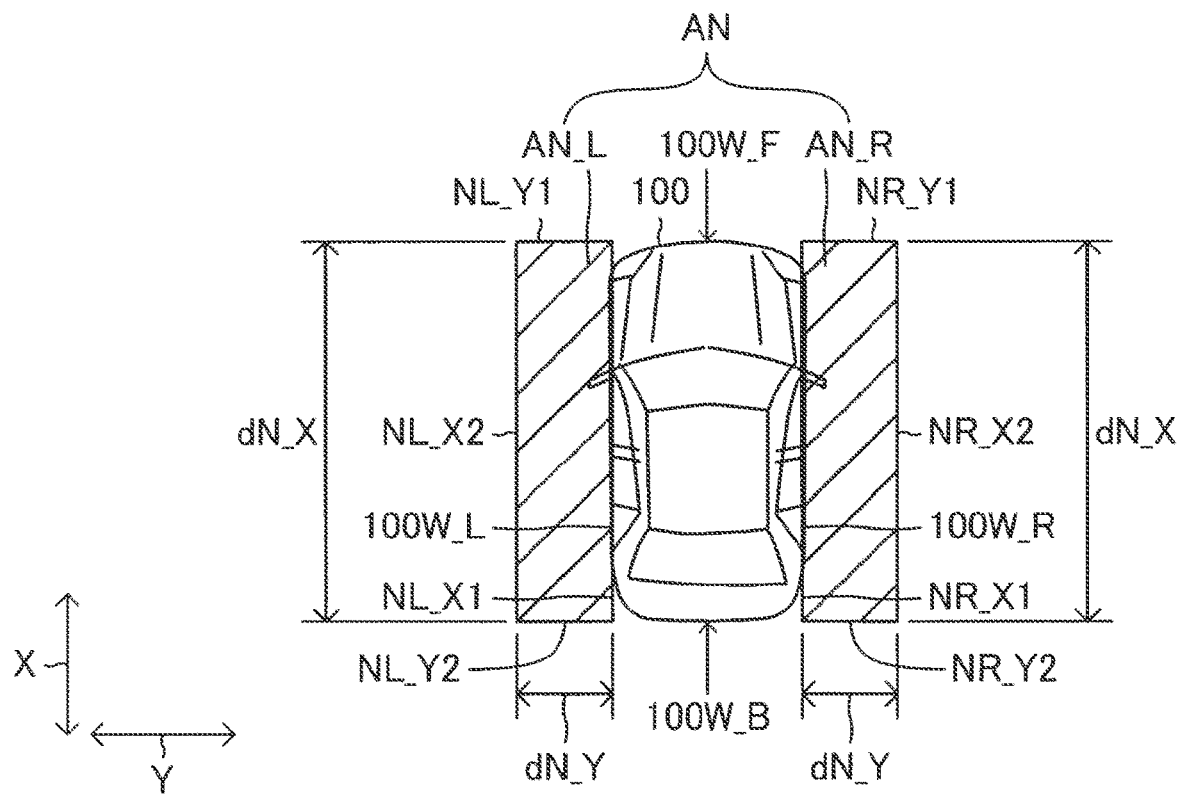
FIG. 8 illustrates proximate areas.

When a predicted movement path R200 is acquired, the drop-off assist device 10 determines based on the predicted movement path R200 whether the approaching vehicle 200A will pass by the door 100D of the host vehicle 100. In the present embodiment, the drop-off assist device 10 determines whether the approaching vehicle 200A will pass by the door 100D of the host vehicle 100, by determining whether the predicted movement path R200 intersects a proximate area AN when seen in plan. As illustrated in FIG. 8, the proximate area AN includes a right-side proximate area AN_R and a left-side proximate area AN_L.

Right-Side Proximate Area

The right-side proximate area AN_R is a rectangular area set on the right side of the host vehicle 100 and surrounded by two longitudinal lines (a longitudinal line NR_X1 and a longitudinal line NR_X2) and two transverse lines (a transverse line NR_Y1 and a transverse line NR_Y2).

The longitudinal line NR_X1 is a line that extends in the longitudinal direction X along a right-side wall 100W_R of the host vehicle 100. The longitudinal line NR_X2 is a line that extends in the longitudinal direction X a predetermined distance dN_Y to the right from the longitudinal line NR_X1 (i.e. the right-side wall 100W_R of the host vehicle 100). Thus, the length of the right-side proximate area AN_R in the transverse direction Y is a length corresponding to the predetermined distance dN_Y.

The transverse line NR_Y1 is a line that extends in the transverse direction Y along a front wall 100W_F of the host vehicle 100. The transverse line NR_Y2 is a line that extends in the transverse direction Y along a rear wall 100W_B of the host vehicle 100. In the present embodiment, the length of the right-side proximate area AN_R in the longitudinal direction X is a length dN_X.

Left-Side Proximate Area

The left-side proximate area AN_L is a rectangular area set on the left side of the host vehicle 100 and surrounded by two longitudinal lines (a longitudinal line NL_X1 and a longitudinal line NL_X2) and two transverse lines (a transverse line NL_Y1 and a transverse line NL_Y2).

The longitudinal line NL_X1 is a line that extends in the longitudinal direction X along a left-side wall 100W_L of the host vehicle 100. The longitudinal line NL_X2 is a line that extends in the longitudinal direction X the predetermined distance dN_Y to the left from the longitudinal line NL_X1 (i.e. the left-side wall 100W_L of the host vehicle 100). Thus, the length of the left-side proximate area AN_L in the transverse direction Y is a length corresponding to the predetermined distance dN_Y.

The transverse line NL_Y1 is a line that extends in the transverse direction Y along the front wall 100W_F of the host vehicle 100. The transverse line NL_Y2 is a line that extends in the transverse direction Y along the rear wall 100W_B of the host vehicle 100. In the present embodiment, the length of the left-side proximate area AN_L in the longitudinal direction X is the length dN_X.

Proximate Line

Figure 9:
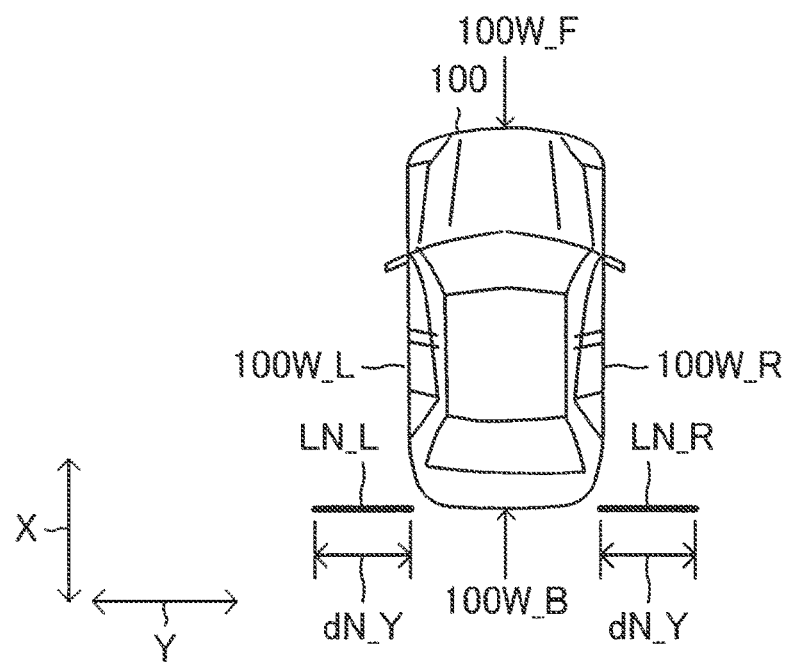
FIG. 9 illustrates proximate lines as the proximate areas.

In the present embodiment, as illustrated in FIG. 9, a right-side proximate line LN_R is used for the right-side proximate area AN_R, and a left-side proximate line LN_L is used for the left-side proximate area AN_L.

The right-side proximate line LN_R is a line that extends from the right-side wall 100W_R of the host vehicle 100 to a point the predetermined distance dN_Y to the right. In other words, the right-side proximate line LN_R corresponds to an area within the predetermined distance dN_Y from the host vehicle 100 in the transverse direction Y. The left-side proximate line LN_L is a line that extends from the left-side wall 100W_L of the host vehicle 100 to a point the predetermined distance dN_Y to the left. In other words, the left-side proximate line LN_L corresponds to an area within the predetermined distance dN_Y from the host vehicle 100 in the transverse direction Y.

The predetermined distance dN_Y is set to at least a distance that is equal to or more than the distance (minimum distance Dm) between a point reached by the distal end of the right-side door 100D_R of the host vehicle 100 when the right-side door 100D_R is fully opened and the right-side wall 100W_R of the host vehicle 100. The predetermined distance dN_Y is set to at least a distance that is equal to or more than the distance (minimum distance Dm) between a point reached by the distal end of the left-side door 100D_L of the host vehicle 100 when the left-side door 100D_L is fully opened and the left-side wall 100W_L of the host vehicle 100.

In the present embodiment, the predetermined distance dN_Y is set to a distance that is longer than the minimum distance Dm, in order to ensure safety, in consideration of the possibility that an occupant of the host vehicle 100 moves transversely further beyond the distal end portion of the door 100D, which has been opened, when the occupant opens the door 100D and gets off the host vehicle 100, the possibility that the approaching vehicle 200A comes closer to the host vehicle 100 in the transverse direction Y even if the predicted movement path R200 is away from the host vehicle 100 by a distance that is longer than the minimum distance Dm when the approaching vehicle 200A is traveling at a location relatively far behind the host vehicle 100, the difficulty in acquiring a significantly accurate predicted movement path R200, etc.

When an approaching vehicle 200A is detected, in addition, the drop-off assist device 10 acquires a predicted arrival time, which is a time predicted to be taken before the approaching vehicle 200A reaches the door 100D of the host vehicle 100, based on the radio-wave information I_R. In the present embodiment, the drop-off assist device 10 acquires a predicted arrival time TTC predicted to be taken before the approaching vehicle 200A reaches the host vehicle 100, as the predicted arrival time predicted to be taken before the approaching vehicle 200A reaches the door 100D of the host vehicle 100.

The drop-off assist device 10 acquires the predicted arrival time TTC through computation based on the longitudinal distance D2_X and the relative speed dV. In the present embodiment, the drop-off assist device 10 acquires the predicted arrival time TTC by dividing the longitudinal distance D2_X by the relative speed dV (TTC=D2_X/dV). The drop-off assist device 10 acquires the predicted arrival time TTC in predetermined computation cycles while the approaching vehicle 200A is detected.

When an approaching vehicle 200A is detected, further, the drop-off assist device 10 determines based on the radio-wave information I_R whether a different vehicle is present between the approaching vehicle 200A and the host vehicle 100. The drop-off assist device 10 determines whether a different vehicle is present between the approaching vehicle 200A and the host vehicle 100 in predetermined computation cycles while the approaching vehicle 200A is detected.

Satisfaction of Movement Path Condition

The drop-off assist device 10 may determine that a provisional movement path condition C_Rp is met when the predicted movement path R200 intersects the proximate area AN, irrespective of the predicted arrival time TTC. In the present embodiment, however, the drop-off assist device 10 determines that the provisional movement path condition C_Rp is met when the predicted movement path R200 intersects the proximate area AN when the approaching vehicle 200A has come close to the host vehicle 100 and the predicted arrival time TTC has become as short as a predetermined predicted arrival time TTC_T, or when the predicted movement path R200 intersects the proximate area AN when the predicted arrival time TTC is equal to or less than the predetermined predicted arrival time TTC_T.

When the drop-off assist device 10 determines that the provisional movement path condition C_Rp is met, the drop-off assist device 10 sets the approaching vehicle 200A, for which the provisional movement path condition C_Rp is met, as a target approaching vehicle 200T.

Figure 10A:
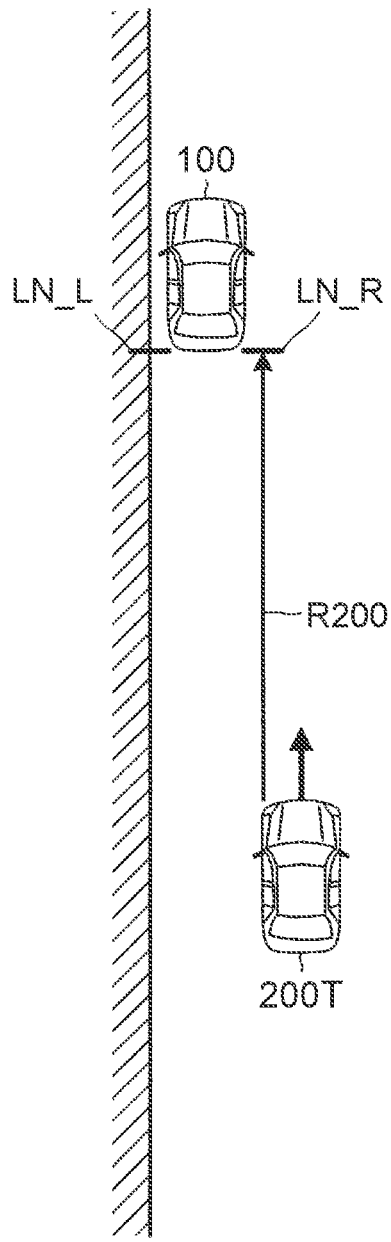
FIG. 10A illustrates a predicted movement path of the left front corner portion of a vehicle (approaching vehicle) that is approaching the host vehicle from behind, which is acquired in a situation in which a different vehicle is not present between the approaching vehicle and the host vehicle.
Figure 10B:
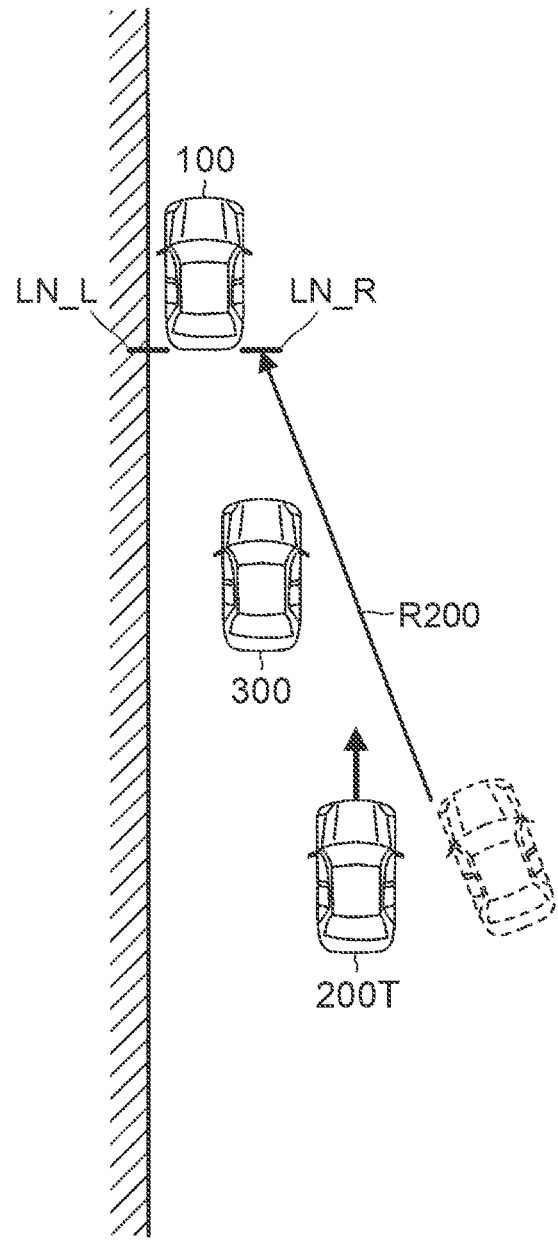
FIG. 10B illustrates a predicted movement path of the left front corner portion of the approaching vehicle acquired in a situation in which a different vehicle is present between the approaching vehicle and the host vehicle.

The drop-off assist device 10 determines that the provisional movement path condition C_Rp is met in the following two cases: a case where the predicted movement path R200 intersects the proximate area AN in a situation in which no vehicle is present between the target approaching vehicle 200T and the host vehicle 100 as illustrated in FIG. 10A; and a case where the predicted movement path R200 intersects the proximate area AN in a situation in which a vehicle 300 is present between the target approaching vehicle 200T and the host vehicle 100 as illustrated in FIG. 10B.

As can be understood from FIG. 10A, when determination is made that the predicted movement path R200 intersects the proximate area AN in a situation in which no vehicle is present between the target approaching vehicle 200T and the host vehicle 100, the predicted movement path R200 is the true movement path of the target approaching vehicle 200T.

As can be understood from FIG. 10B, when determination is made that the predicted movement path R200 intersects the proximate area AN in a situation in which a vehicle 300 is present between the target approaching vehicle 200T and the host vehicle 100, however, the predicted movement path R200 has been acquired based on radio waves affected by diffraction, and therefore may be different from the true movement path of the target approaching vehicle 200T.

Thus, when the drop-off assist device 10 determines that a different vehicle is not present between the target approaching vehicle 200T and the host vehicle 100 when determination is made that the provisional movement path condition C_Rp is met, the drop-off assist device 10 determines that there is a possibility that the target approaching vehicle 200T passes by the door 100D of the host vehicle 100, and that the movement path condition C_R is met.

While the drop-off assist device 10 determines that an alarming condition C_A is met when determination is made that the movement path condition C_R is met in the present embodiment, the drop-off assist device 10 may be configured to determine that the alarming condition C_A is met when the movement path condition C_R is met and an operation by an occupant of the host vehicle 100 to open the door 100D of the host vehicle 100 on the side on which the target approaching vehicle 200T is predicted to pass is detected. The operation to open the door 100D of the host vehicle 100 may be an operation to unlock the door 100D, an operation to actually open the door 100D, etc.

When determination is made that the alarming condition C_A is met, the drop-off assist device 10 issues an alarm.

Figure 11:
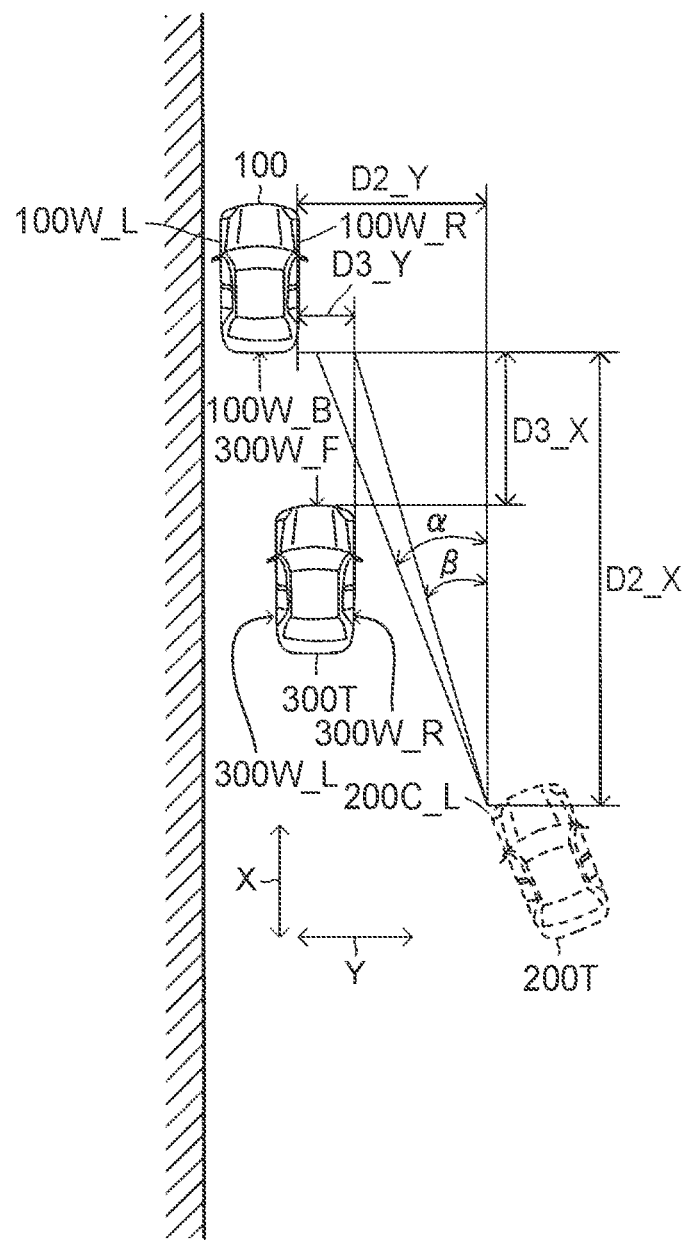
FIG. 11 illustrates the longitudinal distance and the transverse distance of a vehicle (approaching vehicle) that is approaching the host vehicle from behind, which are acquired in a situation in which a different vehicle is present between the approaching vehicle and the host vehicle, the longitudinal distance and the transverse distance of the different vehicle, the approach angle of the approaching vehicle, etc.

When the drop-off assist device 10 determines that a different vehicle is present between the target approaching vehicle 200T and the host vehicle 100, on the other hand, the drop-off assist device 10 sets the different vehicle as a target stationary vehicle 300T, and acquires a "longitudinal distance D2_X of the target approaching vehicle 200T", a "transverse distance D2_Y of the target approaching vehicle 200T", and a "longitudinal distance D3_X of the target stationary vehicle 300T" based on the radio-wave information I_R (see FIG. 11).

As illustrated in FIG. 11, the longitudinal distance D2_X of the target approaching vehicle 200T is the distance in the longitudinal direction X between the "target portion P_T (left front corner portion 200C_L) of the target approaching vehicle 200T" and the "rear wall 100W_B of the host vehicle 100".

The transverse distance D2-Y of the target approaching vehicle 200T is the distance in the transverse direction Y between the "target portion P_T (left front corner portion 200C_L) of the target approaching vehicle 200T" and "one (the right-side wall 100W_R of the host vehicle 100 in the example illustrated in FIG. 11) of the right-side wall 100W_R and the left-side wall 100W_L of the host vehicle 100 that is closer to the target approaching vehicle 200T in the transverse direction Y".

The longitudinal distance D3_X of the target stationary vehicle 300T is the distance in the longitudinal direction X between the "front wall 300W_F of the target stationary vehicle 300T" and the "rear wall 100W_B of the host vehicle 100".

The angle indicated by sign α in FIG. 11 is an approach angle θ of the target approaching vehicle 200T acquired by the drop-off assist device 10 at this time. The approach angle θ of the target approaching vehicle 200T is the angle of the traveling direction D200 of the target approaching vehicle 200T with respect to the longitudinal direction X.

When the longitudinal distance D2_X, the transverse distance D2_Y, and the longitudinal distance D3_X are acquired, the drop-off assist device 10 acquires a transverse distance D3_Y of the target stationary vehicle 300T based on the acquired distances.

The transverse distance D3_Y of the target stationary vehicle 300T is the distance in the transverse direction Y between "one (the right-side wall 300W_R of the target stationary vehicle 300T in the example illustrated in FIG. 11) of the right-side wall 300W_R and the left-side wall 300W_L of the target stationary vehicle 300T that is closer to the target approaching vehicle 200T in the transverse direction Y" and "one (the right-side wall 100W_R of the host vehicle 100 in the example illustrated in FIG. 11) of the right-side wall 100W_R and the left-side wall 100W_L of the host vehicle 100 that is closer to the target approaching vehicle 200T in the transverse direction Y".

The transverse distance D3_Y of the target stationary vehicle 300T is acquired through computation based on the longitudinal distance D2_X, the transverse distance D2_Y, and the longitudinal distance D3_X as indicated by the following formula 1.

$$D3\_Y = D2\_Y \times (D3\_X / D2\_X) \quad (1)$$

When the transverse distance D3_Y of the target stationary vehicle 300T is acquired, the drop-off assist device 10 acquires an angle β through computation based on the longitudinal distance D2_X, the transverse distance D2_Y, and the transverse distance D3_Y as indicated by the following formula 2.

$$\beta = \arctan((D2\_Y - D3\_Y)/D2\_X) \quad (2)$$

Figure 12:
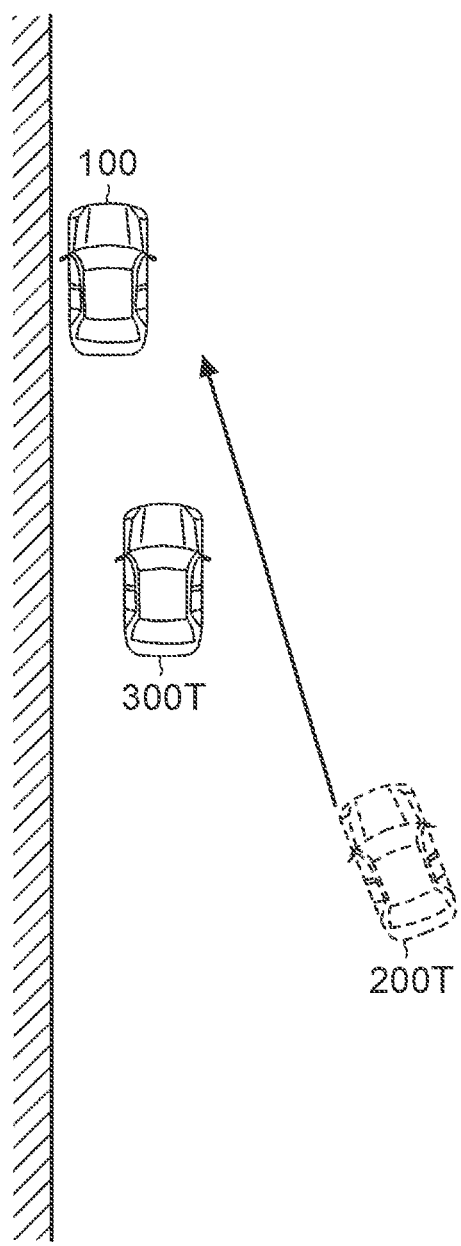
FIG. 12 illustrates a corrected predicted movement path of the left front corner portion of a vehicle (approaching vehicle) that is approaching the host vehicle from behind in a situation in which a different vehicle is present between the approaching vehicle and the host vehicle.

The drop-off assist device 10 acquires a predicted movement path R200 with the acquired angle β set to the approach angle θ. The thus acquired predicted movement path R200 is the path indicated in FIG. 12, for example.

While the approach angle θ of the predicted movement path R200 originally acquired by the drop-off assist device 10 is the angle α as discussed earlier, the approach angle θ acquired through computation by the drop-off assist device 10 in accordance with the formula 2 is the angle β as discussed above.

Thus, the drop-off assist device 10 corrects the originally acquired predicted movement path R200 by acquiring the predicted movement path R200 with the angle β set to the approach angle θ. In other words, the drop-off assist device 10 corrects the predicted movement path R200 based on the position of an edge of a vehicle (target stationary vehicle 300T) that is present between the host vehicle 100 and the target approaching vehicle 200T.

The drop-off assist device 10 determines whether the corrected predicted movement path R200 (corrected predicted movement path R200_C) intersects the proximate area AN.

Figure 13:
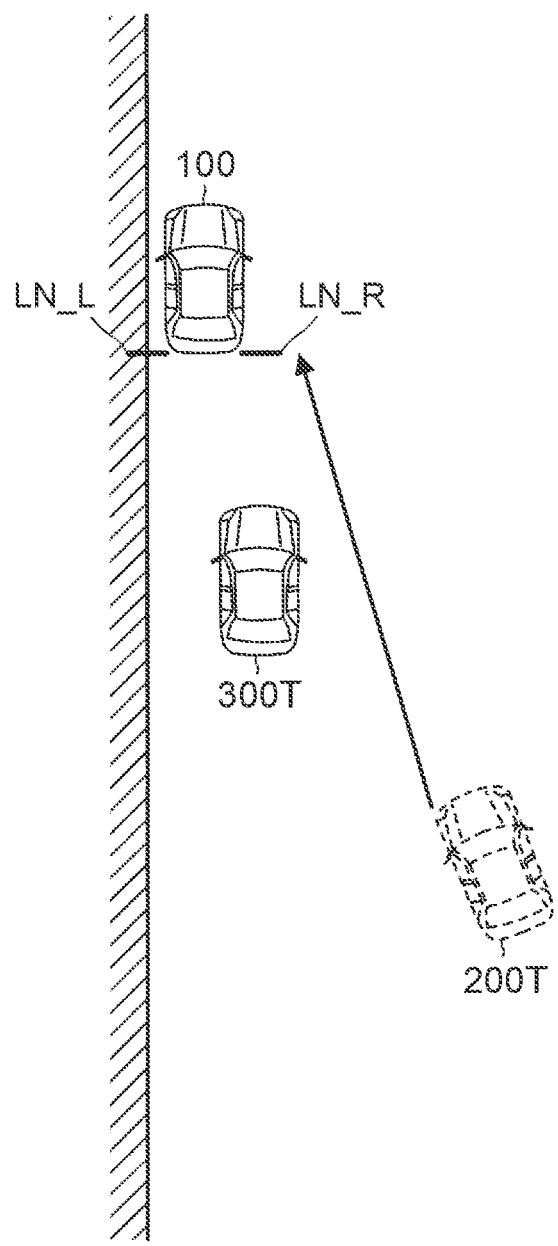
FIG. 13 illustrates the positional relationship between proximate lines and a corrected predicted movement path of the left front corner portion of a vehicle (approaching vehicle) that is approaching the host vehicle from behind in a situation in which a different vehicle is present between the approaching vehicle and the host vehicle.

When the corrected predicted movement path R200_C does not intersect the proximate area AN, as illustrated in FIG. 13, the drop-off assist device 10 determines that there is no possibility that the target approaching vehicle 200T passes by the door 100D of the host vehicle 100. Thus, at this time, the drop-off assist device 10 does not determine that the movement path condition C_R is met, or that the alarming condition C_A is met. Thus, the drop-off assist device 10 does not issue an alarm in this case.

When the corrected predicted movement path R200_C intersects the proximate area AN, on the other hand, the drop-off assist device 10 determines that there is a possibility that the target approaching vehicle 200T passes by the door 100D of the host vehicle 100, and determines that the movement path condition C_R is met.

While the drop-off assist device 10 determines that the alarming condition C_A is met when determination is made that the movement path condition C_R is met as discussed earlier, the drop-off assist device 10 may be configured to determine that the alarming condition C_A is met when the movement path condition C_R is met and an operation by an occupant of the host vehicle 100 to open the door 100D of the host vehicle 100 on the side on which the target approaching vehicle 200T is predicted to pass is detected.

When determination is made that the alarming condition C_A is met, the drop-off assist device 10 issues an alarm.

While operation of the drop-off assist device 10 has been described above based on an example in which the object that is present between the host vehicle 100 and the target approaching vehicle 200T is a vehicle that is stationary, the drop-off assist device 10 operates in the same manner even if the object that is present between the host vehicle 100 and the target approaching vehicle 200T is a moving object.

In the drop-off assist device 10, when a different object (the target stationary vehicle 300T in the example discussed above) is present between the target approaching vehicle 200T and the host vehicle 100, the predicted movement path R200 is corrected based on the position of an edge of the different object, and determination is made based on the corrected predicted movement path R200 whether the target approaching vehicle 200T possibly passes by the door 100D of the host vehicle 100. Therefore, it is possible to precisely determine whether the target approaching vehicle 200T possibly passes by the door 100D of the host vehicle 100 also when a different object is present between the target approaching vehicle 200T and the host vehicle 100.

Specific Operation of Drop-Off Assist Device

Next, specific operation of the drop-off assist device 10 will be described. The CPU of the ECU 90 of the drop-off assist device 10 executes the routine illustrated in FIG. 14 in predetermined time cycles.

Figure 14:
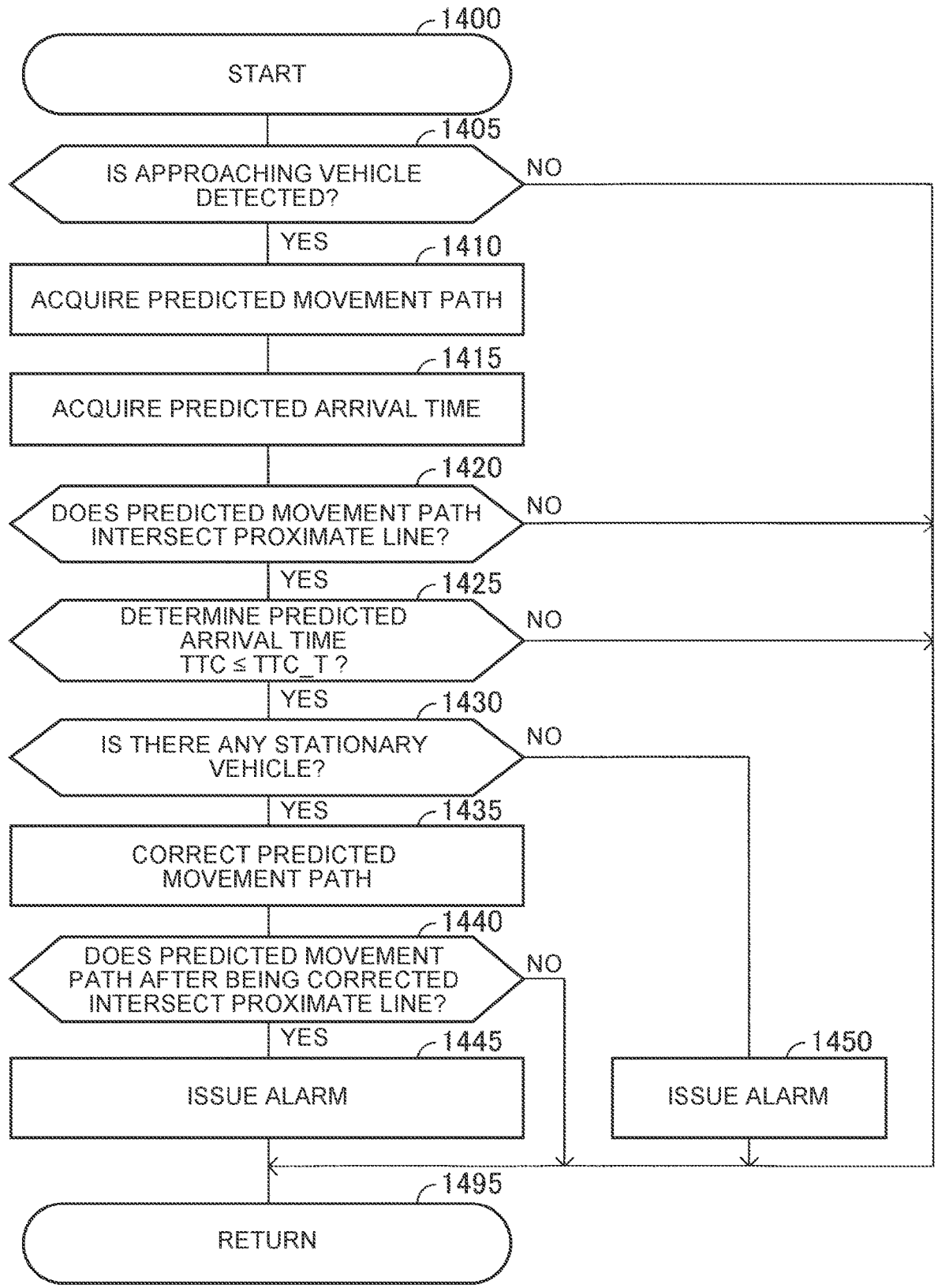
FIG. 14 is a flowchart illustrating a routine executed by the drop-off assist device according to the embodiment of the present disclosure.

Thus, when a predetermined timing comes, the CPU starts a process in step 1400 in FIG. 14, and proceeds to step 1405 to determine whether an approaching vehicle 200A is detected.

When "Yes" is determined in step 1405, the CPU proceeds to step 1410, and acquires a predicted movement path R200. Next, the CPU proceeds to step 1415, and acquires a predicted arrival time TTC. Next, the CPU proceeds to step 1420, and determines whether the predicted movement path R200 intersects the right-side proximate line LN_R or the left-side proximate line LN_L.

When "Yes" is determined in step 1420, the CPU proceeds to step 1425, and determines whether the predicted arrival time TTC is equal to or less than the predetermined predicted arrival time TTC_T.

When "Yes" is determined in step 1425, the CPU proceeds to step 1430, and determines whether a stationary vehicle 300S is present.

When "Yes" is determined in step 1430, the CPU proceeds to step 1435, and corrects the predicted movement path R200 acquired at this time as discussed earlier. Next, the CPU proceeds to step 1440, and determines whether the predicted movement path R200 after being corrected intersects the right-side proximate line LN_R or the left-side proximate line LN_L.

When "Yes" is determined in step 1440, the CPU determines that the alarming condition C_A is met, proceeds to step 1445, and issues an alarm. Next, the CPU proceeds to step 1495, and temporarily ends the present routine.

When "No" is determined in step 1440, on the other hand, the CPU determines that the alarming condition C_A is not met, directly proceeds to step 1495, and temporarily ends the present routine. In this case, an alarm is not issued since the alarming condition C_A is not met.

When "No" is determined in step 1430, the CPU determines that the alarming condition C_A is met, proceeds to step 1450, and issues an alarm. Next, the CPU proceeds to step 1495, and temporarily ends the present routine.

When "No" is determined in step 1405, step 1420, or step 1425, the CPU proceeds to step 1495, and temporarily ends the present routine. When an alarm is issued at this time, the CPU stops issuing the alarm.

Specific operation of the drop-off assist device 10 has been described above.

The present disclosure is not limited to the embodiment described above, and a variety of modifications can be adopted within the scope of the present disclosure.

What is claimed is:

1. A drop-off assist device comprising:
a radio wave sensor configured to detect an object; and
a processor configured to
   detect an object that is approaching a host vehicle based on results of detection by the radio wave sensor,
   acquire a predicted movement path of the object based on the results of the detection by the radio wave sensor when the object is detected,
   set the object as a target approaching object when the predicted movement path acquired by the processor is a path that passes by a door of the host vehicle,
   determine that there is a possibility that the target approaching object passes by the door of the host vehicle when a second object that is different from the target approaching object is not present between the target approaching object and the host vehicle,
   correct the predicted movement path based on a position of an edge of the second object when the second object is present between the target approaching object and the host vehicle at a timing of setting the target approaching object,
   determine that there is the possibility that the target approaching object passes by the door of the host vehicle when the predicted movement path corrected by the processor is the path that passes by the door of the host vehicle, and
   issue an alarm when determining that there is the possibility that the target approaching object passes by the door of the host vehicle.

2. The drop-off assist device according to claim 1, wherein the processor is configured to:
   determine that the predicted movement path acquired by the processor is the path that passes by the door of the host vehicle when the predicted movement path acquired by the processor is a path that passes through an area within a predetermined distance in a vehicle transverse direction from the host vehicle; and
   determine that the predicted movement path corrected by the processor is the path that passes by the door of the host vehicle when the predicted movement path corrected by the processor is the path that passes through the area within the predetermined distance in the vehicle transverse direction.

3. The drop-off assist device according to claim 1, wherein the processor is configured to set the object as the target approaching object when the predicted movement path acquired by the processor is the path that passes by the door of the host vehicle at a time when a time predicted to be taken before the object reaches a location by the door of the host vehicle becomes equal to or less than a predetermined time.

* * * * *